W. S. EWERT.
ARTIFICIAL BAIT.
APPLICATION FILED DEC. 16, 1919. RENEWED DEC. 24, 1921.

1,426,283.

Patented Aug. 15, 1922.

INVENTOR
WALTER SCOTT EWERT.
BY
Walter Scott Ewert
ATTORNEY

UNITED STATES PATENT OFFICE.

WALTER SCOTT EWERT, OF LOS ANGELES, CALIFORNIA.

ARTIFICIAL BAIT.

1,426,283. Specification of Letters Patent. Patented Aug. 15, 1922.

Application filed December 16, 1919, Serial No. 345,262. Renewed December 24, 1921. Serial No. 524,740.

*To all whom it may concern:*

Be it known that I, WALTER SCOTT EWERT, a citizen of the United States, and resident of Los Angeles, in the county of Los Angeles, State of California, have invented certain new and useful Improvements in Artificial Bait, of which the following is a specification.

My invention relates primarily to bait for use in fishing for game fish, either casting or trolling, and the object thereof is to provide a cheap, simple and efficient bait for that purpose.

In the drawings, accompanying and forming a part hereof:

While I have shown and will describe the preferred form of my invention, it will be understood that I do not limit myself to such preferred form but that various changes and adaptations may be made therein without departing from the spirit of my invention.

Figure 1:
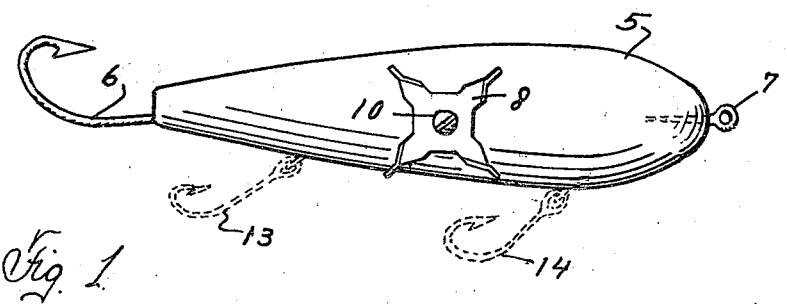
Fig. 1, is a top plan.
Figure 2:
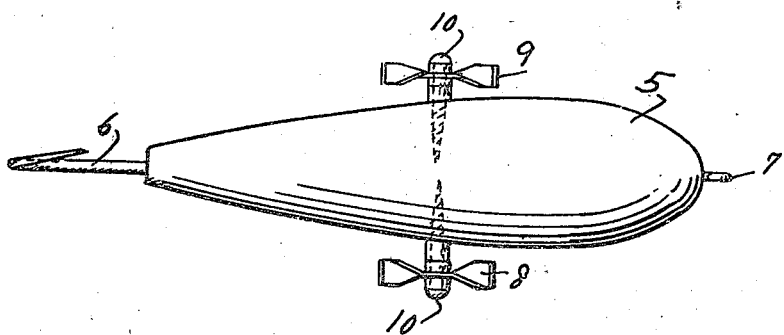
Fig. 2 is a side elevation of my improved bait.

Referring to the drawings my device comprises a fish-like body 5 provided at its rear end with a hook 6 of the usual nature and at its other end with line attaching means 7 of any desired construction. At substantially the center of its length, but slightly below said longitudinal center of body 5 are revolubly mounted paddle wheels or propellers 8 and 9, by means of screws 10, there being one paddle wheel on each side of said body member. Hooks 13 and 14 may be secured to the under side of body 5 if desired, as shown in dotted lines in Fig. 1, or in any other desired position. Paddle wheels 8 and 9 may also be mounted in staggered relation each to the other if desired.

Having described my invention what I claim and desire to secure by Letters Patent is:

An artificial bait comprising a fish like body provided with paddle wheels mounted, one on each side thereof, to rotate in the longitudinal direction of said body, the axes of said wheels being in the same plane, said plane being on the transverse center but slightly below the longitudinal center of the body the inner edges of said wheels lying in planes parallel with the longitudinal axis and outside of the widest portion of said body; line attaching means at one end and a hook at the other end of said body.

In witness that I claim the foregoing I have hereunto subscribed my name this 10th day of December 1919.

WALTER SCOTT EWERT.